United States Patent
Kawase et al.

(10) Patent No.: US 6,812,175 B2
(45) Date of Patent: Nov. 2, 2004

(54) GLASS COMPOSITION FOR AN ELECTRIC LAMP, STEM AND BULB FOR AN ELECTRIC LAMP USING THE SAME, AND ELECTRIC LAMP USING THE SAME

(75) Inventors: Akira Kawase, Nishinomiya (JP); Tomoko Atagi, Takatsuki (JP); Masanobu Ito, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 15 days.

(21) Appl. No.: 10/232,343

(22) Filed: Aug. 30, 2002

(65) Prior Publication Data

US 2003/0050176 A1 Mar. 13, 2003

(30) Foreign Application Priority Data

Aug. 31, 2001 (JP) ........................................ 2001-264587
Nov. 20, 2001 (JP) ........................................ 2001-354882

(51) Int. Cl.⁷ ........................ C03C 3/078; C03C 3/091; C03C 3/085
(52) U.S. Cl. ............................ 501/72; 501/66; 501/69; 501/70
(58) Field of Search ..................... 501/53, 54, 60–62, 501/65–72

(56) References Cited

U.S. PATENT DOCUMENTS

| | | | | |
|---|---|---|---|---|
| 5,308,803 A | * | 5/1994 | Clifford et al. | 501/17 |
| 5,631,195 A | * | 5/1997 | Yanagisawa et al. | 501/72 |
| 5,721,181 A | | 2/1998 | Sehgal et al. | |
| 5,741,745 A | | 4/1998 | Sehgal et al. | |
| 5,858,897 A | * | 1/1999 | Maeda et al. | 501/70 |
| 5,885,915 A | | 3/1999 | Bakóe et al. | |
| 5,908,794 A | * | 6/1999 | Maeda et al. | 501/70 |
| 5,977,001 A | * | 11/1999 | Suha et al. | 501/66 |
| 6,017,838 A | * | 1/2000 | Marlor | 501/70 |
| 6,268,304 B1 | * | 7/2001 | Maeda et al. | 501/65 |
| 6,528,444 B1 | * | 3/2003 | Kondoh et al. | 501/70 |
| 6,552,489 B2 | * | 4/2003 | Sakakibara | 313/636 |
| 2003/0109370 A1 | * | 6/2003 | Ikeneishi et al. | 501/66 |

FOREIGN PATENT DOCUMENTS

| | | | |
|---|---|---|---|
| EP | 0 936 195 A2 | * 8/1999 | ........... C03C/3/087 |
| GB | 1353935 | 5/1974 | |
| JP | 58-99138 | 6/1983 | |
| JP | 58-60638 | 11/1983 | |
| JP | 02263729 A | * 10/1990 | ........... C03C/3/095 |
| JP | 9-12332 | 1/1997 | |
| JP | 9-52729 | 2/1997 | |
| JP | 10-324540 | 12/1998 | |
| JP | 2001270732 A | * 10/2001 | ........... C03C/3/087 |

OTHER PUBLICATIONS

Derwent Abstract 2002–143304 of JP 2001–270732.*
Derwent Abstract 1990–365333 of JP 2–263729.*

* cited by examiner

*Primary Examiner*—Karl Group
*Assistant Examiner*—Elizabeth A. Bolden
(74) *Attorney, Agent, or Firm*—Merchant & Gould P.C.

(57) ABSTRACT

To suppress breakage of glass for an electric lamp in a process in which the glass that has already been formed is processed further, a glass composition for an electric lamp is provided. The glass composition contains, expressed in mol %, 70 to 85% of $SiO_2$, 12 to 17% of $R_2O$, and 2 to 8.5% of MO (where R represents at least one selected from Li, Na and K, and M represents at least one selected from Mg, Ca, Sr, Ba, Zn and Pb). In the glass composition, the respective contents of CaO, MgO, BaO and SrO satisfy the relationship, CaO+MgO>BaO+SrO. The glass composition has a brittleness index value B determined by the Vickers hardness test of 7,000 $m^{-1/2}$. Preferably, the contents of SrO and BaO are 0 to 0.5% and 0.1 to 1%, respectively. More preferably, the respective contents of $K_2O$ and $Na_2O$ satisfy the relationship, $K_2O > Na_2O$.

6 Claims, 8 Drawing Sheets

GLASS COMPOSITION FOR AN ELECTRIC LAMP, STEM AND BULB FOR AN ELECTRIC LAMP USING THE SAME, AND ELECTRIC LAMP USING THE SAME

BACKGROUND OF THE INVENTION

1. Field of the Invention

The present invention relates to a glass composition for an electric lamp, a stem and a bulb for an electric lamp using the glass composition, and an electric lamp using the glass composition.

2. Related Background Art

Conventionally, lead glass has been representative of glass for an electric lamp. However, the lead glass contains about 10% or more of lead oxide (PbO), and thus from the viewpoint of environmental protection, alternative glass compositions having reduced lead content have been proposed. For example, JP 9(1997)-12332 A discloses a glass composition that is suitable for forming by the Danner process. Further, JP10(1998)-324540 A discloses a glass composition that is suitable for forming and capable of suppressing corrosion of a furnace material.

However, conventional alternative glass compositions as described above are too brittle compared with lead glass, and thus the electric lamps are likely to be broken during manufacturing processes. Particularly in recent years, a trend has been toward electric lamps having more complicated shapes. In such a trend, a fluorescent lamp also has been on the market in which a bulb formed into a straight tube by the Danner process or the like is bent into U shape. Further, some cases require processing in which inner portions of a plurality of bulbs are made continuous with each other using another glass tube. Furthermore, manufacturing of a stem also involves post-processing such as sealing of lead wire or the like. These processes, namely processes in which glass that has already been formed further is processed, cause breakage of the glass. Thus, in a mass production process of an electric lamp, it has been requested that such breakage of glass be reduced.

SUMMARY OF THE INVENTION

A first glass composition for an electric lamp according to the present invention contains, expressed in mol % (hereinafter, constituents in each composition are given in mol % unless otherwise noted):

| | |
|---|---|
| SiO$_2$ | 70 to 85%, |
| R$_2$O | 12 to 17%, |
| MO | 2 to 8.5%, |

(where R represents at least one selected from the group consisting of Li, Na and K, and M represents at least one selected from the group consisting of Mg, Ca, Sr, Ba, Zn and Pb). In the first glass composition, a total amount of CaO and MgO is larger than a total amount of BaO and SrO. The first glass composition has a brittleness index value B determined by the Vickers hardness test of 7,000 m$^{-1/2}$ or lower.

It is known that the brittleness of glass can be evaluated based on the ratio between the respective lengths of an indentation and a crack that are produced by the Vickers hardness test (Japanese Industrial Standards, Z 2244). JP 9(1997)-52729 A discloses an example in which the ratio is used as an index for obtaining glass with high abrasion resistance. The above-mentioned glass composition has a property suited for an electric lamp while achieving a lower level of brittleness.

A second glass composition according to the present invention contains:

| | |
|---|---|
| SiO$_2$ | 70 to 85%, |
| Al$_2$O$_3$ | 0 to 10%, |
| B$_2$O$_3$ | 0 to 10%, |
| Li$_2$O | 0 to 6%, |
| Na$_2$O | 1 to 7%, |
| K$_2$O | 5 to 15%, |
| MgO | 0 to 5%, |
| CaO | 0 to 5%, |
| SrO | 0 to 0.5%, |
| BaO | 0.1 to 1% |
| ZnO | 0 to 2%, |
| PbO | 0 to 8.5%, | in which a total amount of Li$_2$O, Na$_2$O and K$_2$O constitutes 12 to 17%, a total amount of MgO, CaO, SrO, BaO, ZnO and PbO constitutes 2 to 8.5%, and K$_2$O is contained in a larger amount than an amount of Na$_2$O. This glass composition also has lower brittleness and a property suited for an electric lamp.

DETAILED DESCRIPTION OF THE INVENTION

Hereinafter, the present invention will be described by way of a particular embodiment.

Figure 1:
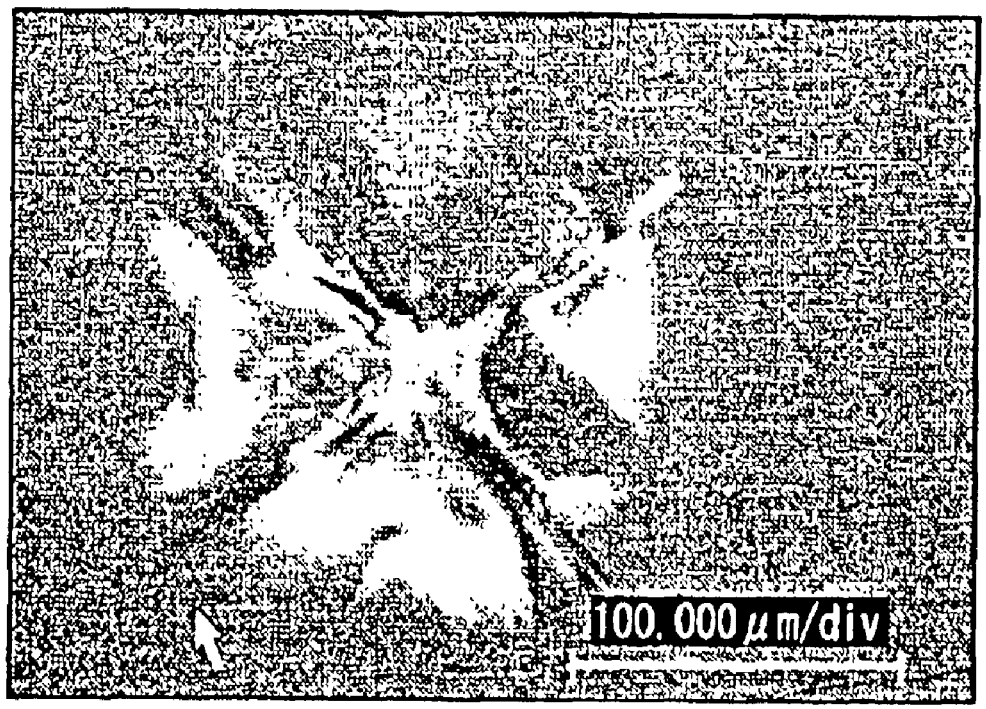
FIG. 1 is a perspective view showing examples of an indentation and a crack produced on a surface of glass by the Vickers hardness test.
Figure 2A:
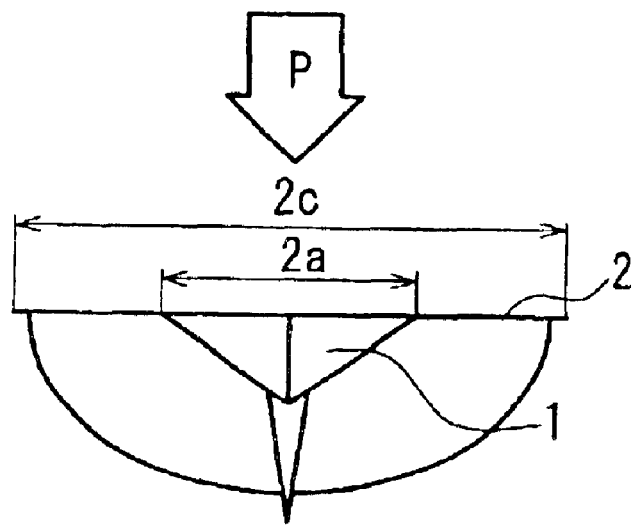
FIGS. 2A and 2B are schematic sectional and plan views of an indentation and a crack produced on a surface of glass by the Vickers hardness test, respectively.
Figure 2B:
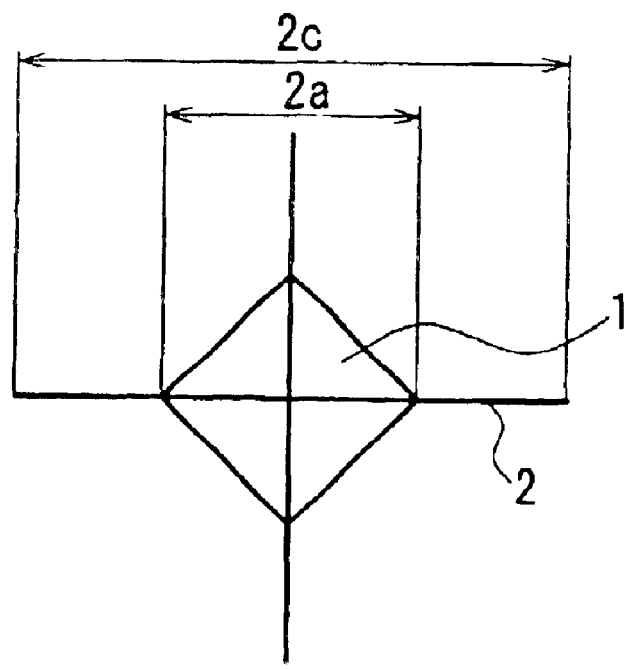

When a Vickers indenter is pressed into a glass sheet with a predetermined pressure applied, an indentation 1 and a crack 2 as shown in FIGS. 1, 2A and 2B are produced on a surface of the glass sheet. The greater the brittleness of the glass sheet, the larger the ratio of a length 2c of the crack to a size of the indentation 2a (a length of a diagonal). In consideration of a load P, the brittleness of glass can be evaluated based on a brittleness index value B expressed by the following equation (1):

$$B = \gamma \cdot (c/a)^{3/2} \cdot P^{-1/4} \qquad (1)$$

where a constant $\gamma$ is $2.39 \times 10^3$ (N$^{1/4}$·m$^{-1/2}$).

In order to prevent the breakage of the glass in a manufacturing process, the brittleness index value B is required to be 7,000 $m^{-1/2}$ or lower, and is preferably 6,800 $m^{-1/2}$ or lower, and more preferably 6,600 $m^{-1/2}$ or lower.

In order to lower the brittleness index value B (to reduce the brittleness of the glass), desirably, $SiO_2$, which is a constituent forming a skeleton of the glass, is contained in the largest possible amount. However, when the content of $SiO_2$ is too high, the softening temperature of the glass becomes too high to allow shaping of the glass, and further, the thermal expansion coefficient of the glass becomes too low. Thus, the content of $SiO_2$ is preferably 70 to 85%, and most preferably 73 to 80%.

By controlling $SiO_2$ alone, the brittleness index value B only can be regulated in a limited range, and thus, desirably, the brittleness index value B further is regulated by other constituents. Among such other constituents are a univalent metal R represented by an alkali metal and a bivalent metal M represented by an alkaline-earth metal. The univalent metal R is arranged at an end of a $SiO_2$ skeleton (for example, Si—O—R). On the other hand, conceivably, the bivalent metal M exists in such a manner as to be integrated into a $SiO_2$ skeleton with a three-dimensional structure (for example, Si—O—M—O—). Therefore, when a stress is applied to a glass skeleton, a bivalent metal is less likely to be moved and relieve the stress than a univalent metal. Thus, in order to reduce the brittleness, the content of a bivalent metal oxide MO is reduced to not more than 8.5%, and most preferably, as low as not more than 7.5%. In this case, in order to regulate the properties of the glass such as the thermal expansion coefficient and electric resistance, preferably, bivalent metals are added in a total amount of not less than 2%.

Further detailed study has revealed that the degree to which the bivalent metal oxide MO contributes to the brittleness of glass varies depending on the type of the bivalent metal oxide MO. The higher bond energy with an oxygen atom a metal has, the more the metal increases the brittleness when compared in a unit content. Table 1 shows enthalpy (bond enthalpy) of an M—O bond in each of typical examples of the bivalent metal oxide MO.

TABLE 1

| Metal Oxide MO | Bond Enthalpy (kJ/mol) |
|---|---|
| Mg—O | 363.2 |
| Ca—O | 402.1 |
| Sr—O | 425.5 |
| Ba—O | 561.9 |
| Zn—O | 159 |
| Pb—O | 382 |

A comparison among alkaline-earth metals indicates that the larger the atomic number of a metal, the greater the bond energy of the metal with respect to oxygen. Thus, alkaline-earth metals should be added so that a total amount of BaO and SrO that are relatively high in bond energy is smaller than a total amount of MgO and CaO that are relatively low in bond energy. In order to reduce the brittleness of the glass, preferably, the contents of SrO and BaO are not more than 0.5% and not more than 1%, respectively. When the total amount of SrO and BaO is not more than 1.5%, the brittleness further is reduced. In this case, since BaO contributes to the enhancement of an electric insulation property of the glass or the like, preferably, BaO is added in an amount of not less than 0.1%. When chemical resistance needs to be enhanced, SrO should be added (SrO>0).

In order to improve meltability and the chemical resistance, ZnO may be contained in an amount up to a limit of 2% so that the brittleness index value B is not overly increased. Further, PbO also may be contained in an amount up to a limit of 8.5% so that the brittleness index value B is not overly increased. Since a high content of PbO may cause coloring of the glass in a firing process, preferably, the content of PbO does not exceed 5%. From the viewpoint of environmental protection, more preferably, the content of PbO is reduced to an impurity level (not more than 1%).

Figure 3:
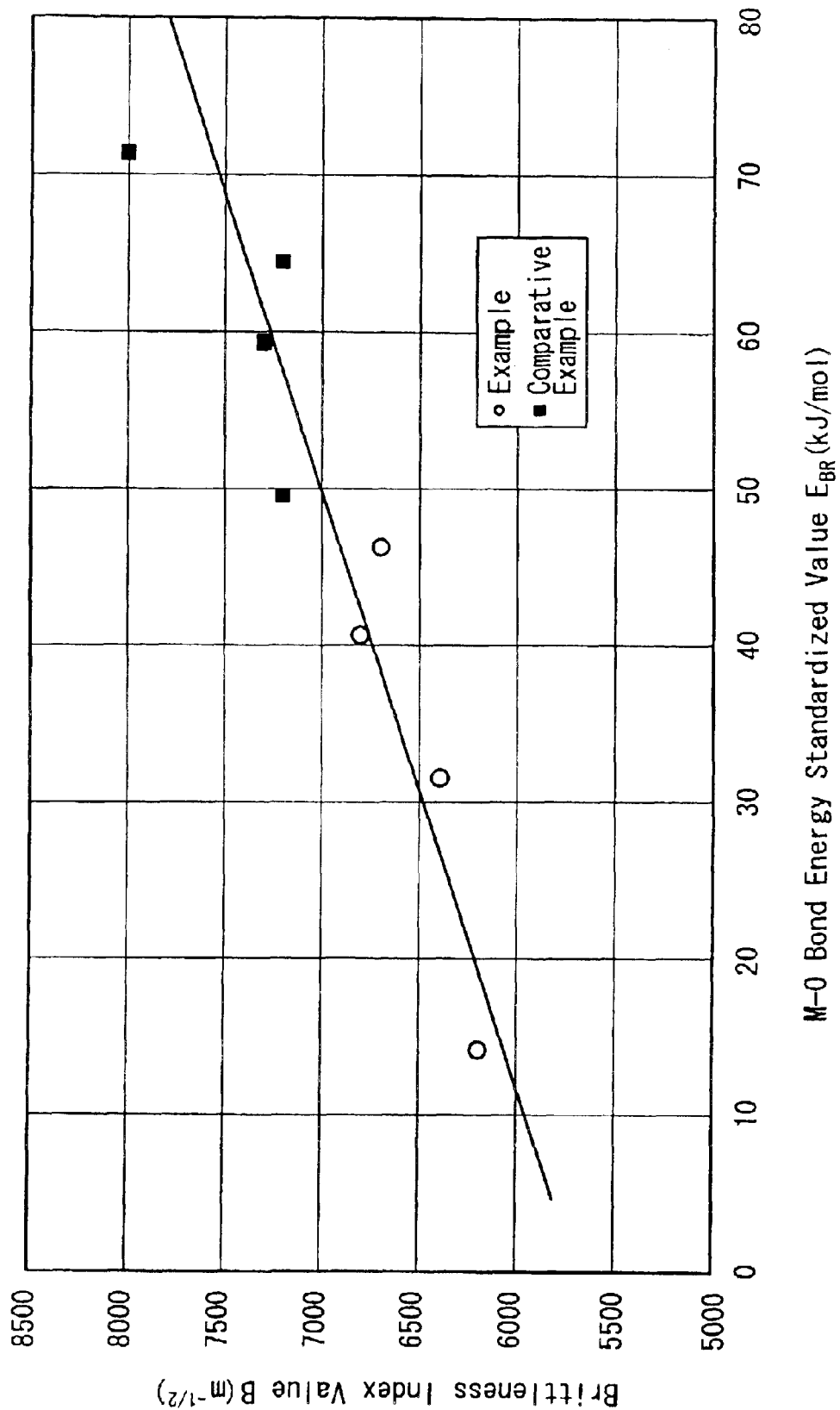
FIG. 3 is a graph showing an example of a relationship between a brittleness index value B and an M—O bond energy standardized value E$_{BR}$.

The foregoing description leads to the following conclusion. That is, where a total amount of the bond energy of the bivalent metal oxide M—O is calculated from a composition ratio, a value (hereinafter, referred to as "an M—O bond energy standardized value") obtained by standardizing the total amount by the content of $SiO_2$ is substantially in proportion to the brittleness index value B as an actual measured value (refer to FIG. 3, showing the results of Examples that will be described later) An M—O bond energy standardized value $E_{BR}$ can be calculated using the bond enthalpy shown in Table 1 based on the following equation (2):

$$E_{BR}=\Sigma(\text{MO content rate (mol \%)} \times \text{M—O bond enthalpy})/(SiO_2 \text{ content (mol \%)}) \quad (2).$$

The M—O bond energy standardized value $E_{BR}$ is preferably 47 kJ/mol or lower, and more preferably 40 kJ/mol or lower.

When a total content of alkaline-earth metal oxides is too low, the chemical resistance or the like of the glass is overly decreased. Thus, preferably, MgO and CaO are added in a total amount of not less than 1%. Preferably, both MgO and CaO are added (MgO>0, CaO>0). In this case, when a total content of these oxides is too high, the glass becomes more likely to be devitrified, and thus MgO and CaO should be added in amounts in the range of not more than 5%, respectively.

A univalent metal oxide $R_2O$ that exhibits high mobility in the glass preferably is added in an amount in the range of 12 to 17%. Generally, the contents of alkali metal oxides are regulated so that the required melt-processability or the like is attained. However, in the glass composition according to the present invention, since the composition contains a high content of $SiO_2$ and thus is likely to have an excessively low thermal expansion coefficient α, the alkali metal oxides are used further as regulators so that the thermal expansion coefficient α falls within an appropriate range. It is potassium (K) that is an alkali metal contributing greatly to the increase of the thermal expansion coefficient α, and thus the content of $K_2O$ is preferably 5 to 15%, and more preferably not less than 7%. Of all the alkali metal oxides, it is also $K_2O$ that contributes most to the reduction of the brittleness. Accordingly, $K_2O$ should be contained in a larger amount than an amount of $Na_2O$.

In order to obtain a so-called mixed alkali effect and achieve a reduction in material cost, $Na_2O$ should be added as well as $K_2O$. Preferably, the content of $Na_2O$ is 1 to 7%. Although not an indispensable constituent, $Li_2O$ may be added in an amount up to a limit of 6% so that the mixed alkali effect is more enhanced.

When the glass composition is used for a stem for an electric lamp, the regulation of the thermal expansion coefficient α is particularly important. For voltage supply to the inner electrodes of a fluorescent lamp, Dumet wire (wire formed by coating a Ni—Fe alloy with Cu) is sealed into the stem. The thermal expansion coefficient α of the Dumet wire is $94 \times 10^{-7}$ $K^{-1}$. Thus, desirably, the glass also has a thermal expansion coefficient equivalent thereto or somewhat higher so that a moderate compressive stress is applied to the Dumet wire. The thermal expansion coefficient α is preferably 91 to 97×10$^{-7}$ K$^{-1}$, and most preferably 91 to 95×10$^{-7}$ K$^{-1}$. In this specification, the thermal expansion coefficient α represents values that are determined by measurements performed at temperatures in the range of 30 to 380° C.

Desirably, the glass composition for an electric lamp also has excellent properties in terms of an electric resistance value and the chemical resistance. When the glass has an excessively low electric resistance value, an insulation property of the glass disappears. Thus, preferably, the glass has an electric resistance value, which is determined by a measurement performed at a temperature of 250° C., of 10$^{6.5}$ Ω·cm or higher, for example, 10$^{7.0}$ to 10$^{9.0}$ Ω·cm. Preferably, the glass has an alkali elution amount, which is determined by a measurement according to JIS R 3502, of not more than 1.5 mg, for example, as low as about 0.3 to 1.2 mg.

In order to maintain an excellent melt-processability, preferably, the working temperature of the glass composition is 1,100° C. or lower, for example, 950 to 1,050° C. Preferably, the softening temperature and the glass transition temperature of the glass are 600 to 700° C. and about 450 to 550° C., respectively.

The glass composition described above further may contain Al$_2$O$_3$ and B$_2$O$_3$. The upper limits of the respective contents of Al$_2$O$_3$ and B$_2$O$_3$ are preferably 10%, and most preferably 5%, respectively. Furthermore, the above-mentioned glass composition may contain trace constituents other than the constituents described above such as Sb$_2$O$_3$, CeO$_2$, Fe$_2$O$_3$, TiO$_2$ and ZrO$_2$. In this case, preferably, the glass composition is controlled so that the upper limits of the respective contents of these trace constituents are 2%, respectively.

The glass composition according to the present invention is applicable to various types of electric lamps regardless of the emission mechanism, the shape or the like of an electric lamp. The following description is directed to some examples of such electric lamps.

Figure 4:
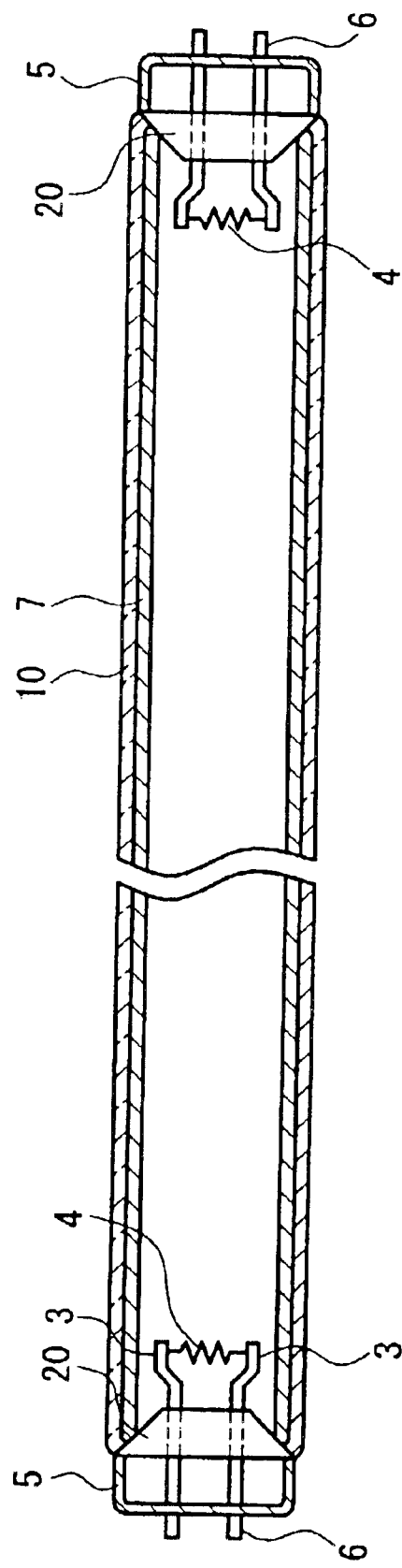
FIG. 4 is a cross-sectional view showing an example of an electric lamp according to the present invention.

In a straight tube fluorescent lamp shown in FIG. 4, stems 20 are attached hermetically to both ends of a bulb 10. A pair of lead wires 3 penetrate each of the stems 20 hermetically. Each of the lead wires is formed, for example, in the following manner. That is, a portion to be brought into contact with the stem is formed of Dumet wire, and both ends are formed of a Fe—Ni alloy. A filament electrode 4 to which an electron emissive substance is applied is provided so as to bridge a gap between each pair of the lead wires 3. Bases 5 are fixed to both the ends of the bulb, and base pins 6 connected electrically to the respective lead wires are attached firmly to these bases. A phosphor layer 7 is formed on an inner surface of the bulb, and an inner space of the bulb is in a reduced pressure atmosphere containing mercury and rare gases.

The glass composition according to the present invention is suited particularly for use for electric lamps as shown in FIGS. 5 to 8, including an electric lamp in which a bulb formed into a straight tube further is processed by being bent, and an electric lamp that has a plurality of bulbs processed so that inner spaces of the plurality of bulbs are made continuous with each other.

Figure 5A:
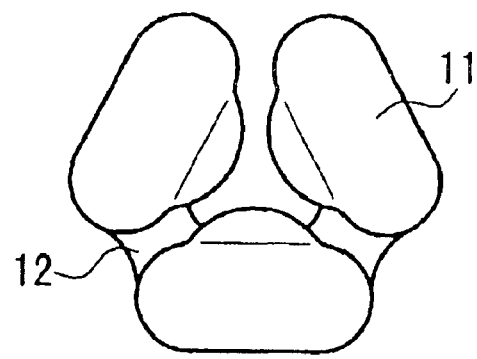
FIGS. 5A and 5B are plan and side views showing an example of the electric lamp according to the present invention, respectively.
Figure 5B:
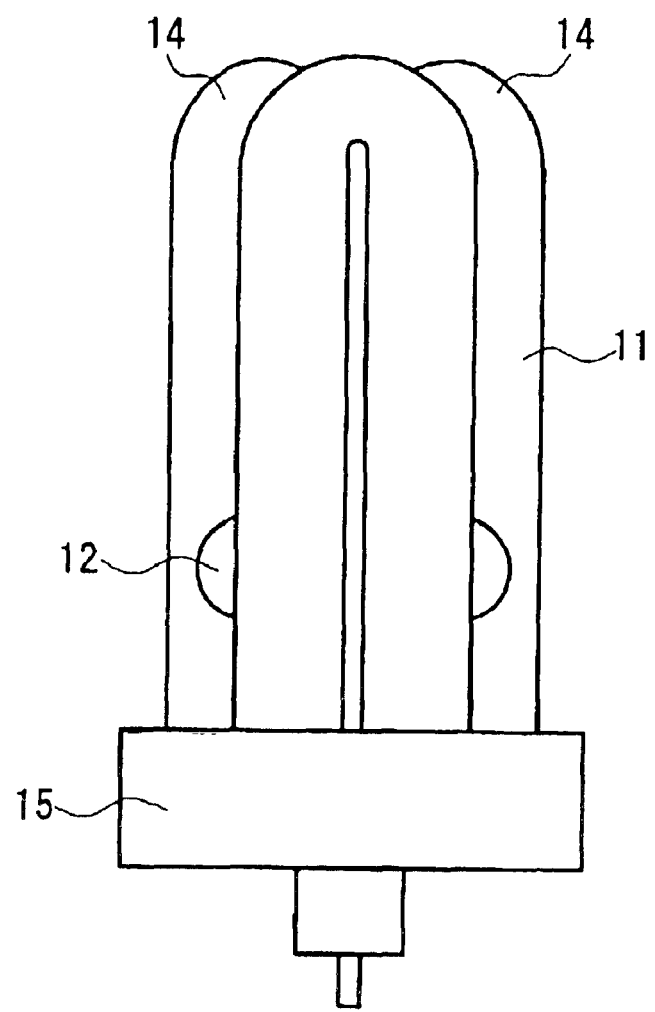

A fluorescent lamp shown in FIGS. 5A and 5B is referred to as a light bulb type and includes a plurality (three in the case of the lamp shown in the figure) of bulbs 11 each bent into a substantially U shape whose open side is supported by a housing portion 15. The three bulbs are connected to each other by a bridge portion 12 and share a discharging space. The use of the glass composition according to the present invention allows breakage that is caused in bent portions 14 of the bulbs and portions connected by the bridge portion 12 to be suppressed.

Figure 6:
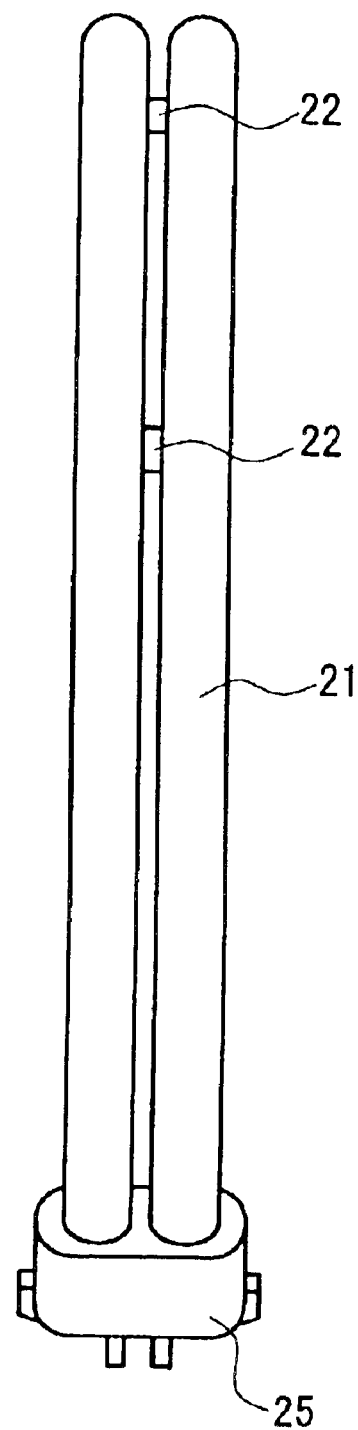
FIG. 6 is a side view showing an example of the electric lamp according to the present invention.
Figure 7:
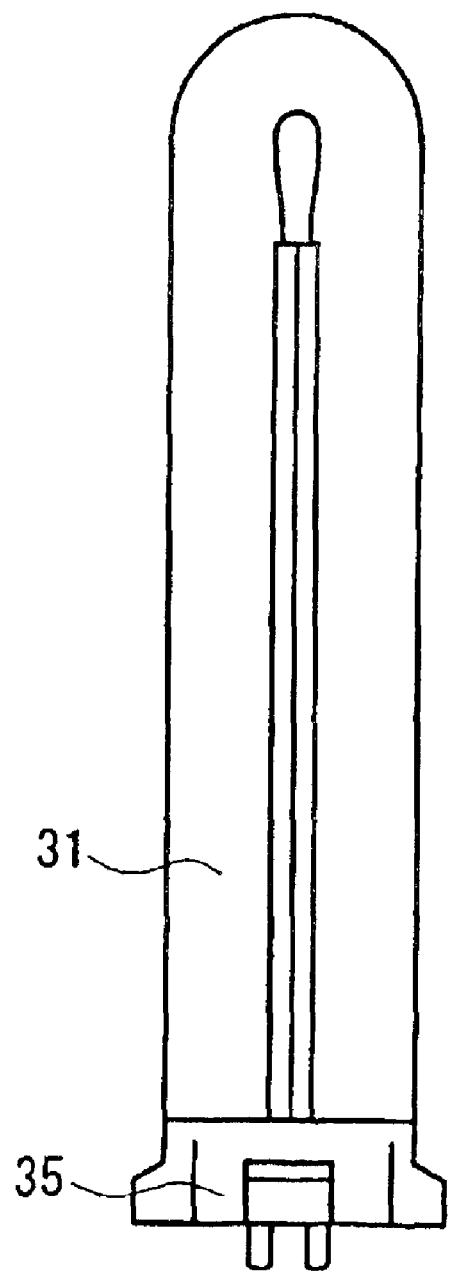
FIG. 7 is a side view showing an example of the electric lamp according to the present invention.
Figure 8:
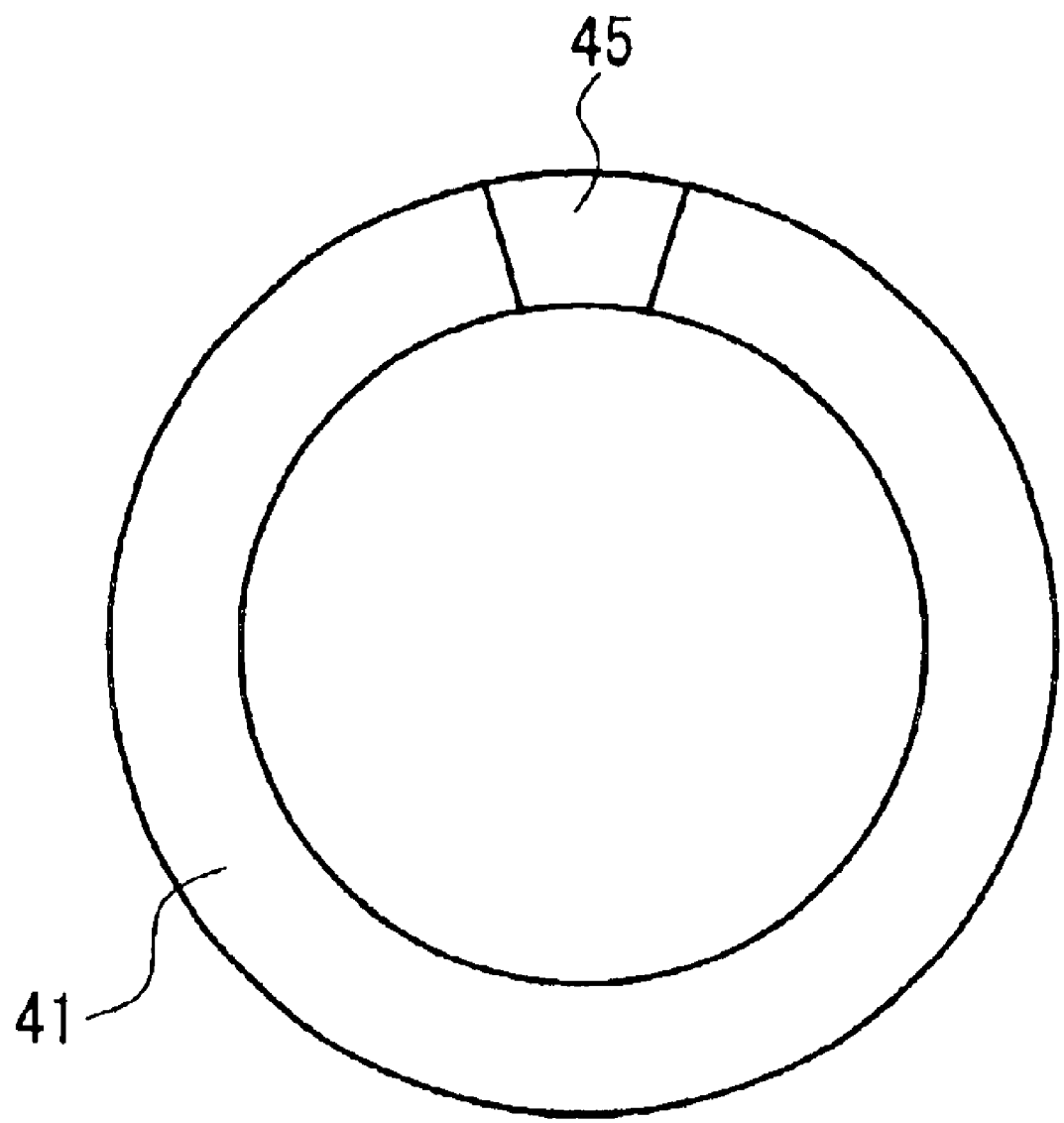
FIG. 8 is a side view showing an example of the electric lamp according to the present invention.

A fluorescent lamp shown in FIG. 6 is referred to as a twin tube type and includes two straight tube-shaped bulbs 21 whose one ends are closed. The other end of each of the two straight tube-shaped bulbs 21 is supported by a housing portion 25. The two bulbs are connected to each other by a bridge portion 22 and share a discharging space. A fluorescent lamp shown in FIG. 7 is referred to as a U-shaped tube type and includes one bulb 31 that is bent into substantially U shape whose open side is supported by a housing portion 35. A fluorescent lamp shown in FIG. 8 is referred to as a circular tube type and includes one bulb 41 that is bent into substantially a circular shape. Both ends of the bulb 41 are supported by a housing portion 45 that is integrated into a portion of the circular shape.

Although duplicate descriptions are omitted, basically, in each of the fluorescent lamps shown in FIGS. 5 to 8, stems, lead wires and the like are disposed in the same manner as those in the lamp shown in FIG. 4. The glass composition according to the present invention is suited for use for fluorescent lamps such as the examples described above, particularly for use for a fluorescent lamp in which a straight tube-shaped bulb(s) is/are processed by being bent and/or processed so that inner portions of the bulbs are made continuous with each other, or a fluorescent lamp including stems into which lead wires formed of Dumet wire or the like are sealed. However, the usefulness of the glass composition according to the present invention is not limited thereto and also can be extended to other types of electric lamps. Furthermore, the present invention also is not limited to the aforementioned examples in terms of an emission mechanism and can be applied to, for example, an incandescent light bulb, an electrodeless lamp with an emission mechanism utilizing electromagnetic induction or the like.

EXAMPLE

Various types of glass having compositions shown in Tables 2 and 3 were manufactured and evaluated for their respective properties. Specifically, in each case of these types of glass, glass materials that had been mixed so as to give a predetermined composition were put in a platinum pot. The mixed glass materials were melted in an electric furnace. Then, the glass materials were poured onto a carbon plate and allowed to cool.

TABLE 2

| | | | | (mol %) |
| --- | --- | --- | --- | --- |
| | Example 1 | Example 2 | Example 3 | Example 4 |
| SiO$_2$ | 77 | 80.5 | 74.5 | 75 |
| Al$_2$O$_3$ | 1.5 | 1.5 | 1.5 | 1.5 |
| B$_2$O$_3$ | 0.5 | 0.5 | 1.5 | 1 |
| Li$_2$O | 0 | 0 | 0 | 0 |
| Na$_2$O | 7 | 7 | 6 | 7 |
| K$_2$O | 8 | 8 | 8 | 8 |
| Subtotal of R$_2$O | 15 | 15 | 14 | 15 |
| MgO | 3.5 | 0.5 | 3.5 | 3.5 |
| CaO | 1.5 | 1 | 3.5 | 2.5 |
| SrO | 0 | 0 | 0.5 | 0.5 |
| BaO | 1 | 1 | 1 | 1 |
| Subtotal of MO | 6 | 2.5 | 8.5 | 7.5 |
| α (× 10$^{-7}$K$^{-1}$) | 95.0 | 92.9 | 93.1 | 97.0 |
| E$_{BR}$ (kJ/mol) | 31.6 | 14.2 | 46.4 | 40.7 |
| B (m$^{-1/2}$) | 6,400 | 6,200 | 6,700 | 6,800 |
| R (log (Ω · cm)) | 7.2 | 7.7 | 8.2 | 8.1 |
| Transition temp. (° C.) | 487 | 483 | 507 | 495 |
| Softening temp. (° C.) | 675 | 659 | 696 | 681 |
| Working temp. (° C.) | 1,032 | 984 | 1,053 | 1,025 |

TABLE 2-continued

| | (mol %) | | | |
|---|---|---|---|---|
| | Example 1 | Example 2 | Example 3 | Example 4 |
| Alkali elution amount (mg) | 0.5 | 0.9 | 0.4 | 0.5 |

TABLE 3

| | (mol %) | | | |
|---|---|---|---|---|
| | Comp. Ex. 1 | Comp. Ex. 2 | Comp. Ex. 3 | Comp. Ex. 4 |
| $SiO_2$ | 70.5 | 70.6 | 73.5 | 76.1 |
| $Al_2O_3$ | 1.2 | 1.2 | 2.2 | 0.9 |
| $B_2O_3$ | 1.3 | 1.0 | | |
| $Li_2O$ | 3.2 | | 2.6 | |
| $Na_2O$ | 8.3 | 15.4 | 7.7 | 9.4 |
| $K_2O$ | 3.3 | 0.8 | 3.4 | 3.7 |
| Subtotal of $R_2O$ | 14.8 | 16.1 | 13.8 | 13.1 |
| MgO | 3.1 | 5.6 | 2.9 | |
| CaO | 4.2 | 5.4 | 2.2 | |
| SrO | 3.6 | | 1.7 | |
| BaO | 1.2 | | 3.7 | |
| PbO | | | | 9.9 |
| Subtotal of MO | 12.1 | 11.0 | 10.5 | 9.9 |
| Others | 0.1 | 0.1 | 0.1 | |
| $\alpha$ (× $10^{-7}K^{-1}$) | 93.6 | 97.4 | 96.7 | 94 |
| $E_{BR}$ (kJ/mol) | 71.4 | 59.5 | 64.6 | 49.6 |
| B ($m^{-1/2}$) | 8,000 | 7,300 | 7,200 | 7,200 |
| R (log ($\Omega \cdot cm$)) | 8.2 | 6.6 | 7.9 | 8.2 |
| Transition temp. (° C.) | 498 | 538 | 499 | 451 |
| Softening temp. (° C.) | 665 | 697 | 678 | 615 |
| Working temp. (° C.) | 1,020 | 990 | 965 | 960 |
| Alkali elution amount (mg) | 0.2 | 0.8 | 0.3 | 0.5 |

In the tables, a thermal expansion coefficient α represents values determined by measurements performed at temperatures of 30 to 380° C. based on JIS R 3102. As described above, a brittleness index value B was calculated from the ratio between the respective lengths of an indentation and a crack that were produced by the Vickers hardness test (JIS Z 2244) based on the equation (1). The load P was 1,000 g. An electric resistance value R was determined by measurements performed at a temperature of 250° C. (logarithm values are shown in the tables). A glass transition temperature and a softening temperature were determined based on JIS R 3102 and JIS R 3104, respectively. A working temperature was obtained as a temperature at which a viscosity of $10^3$ Pa·s was attained based on measured values shown by a high-temperature viscosity curve. An alkali elution amount was determined based on JIS R 3502. In the Comparative Examples, trace constituents categorized as "others" in the table represent $Sb_2O_3$, $CeO_2$ and $Fe_2O_3$.

FIG. 3 shows a summary of the respective values of the brittleness index value B and an M—O bond energy standardized value $E_{BR}$ with respect to Examples 1 to 4 and Comparative Examples 1 to 4. The brittleness index value B and the M—O bond energy standardized value $E_{BR}$ were substantially in proportion to each other.

As described in the foregoing discussion, the glass composition for an electric lamp according to the present invention allows breakage of glass to be suppressed, which is caused in a process in which glass that has been formed is processed further. The glass composition satisfies a property that is required of an electric lamp from a practical viewpoint and achieves an extremely high level of usefulness in this technical field of the invention.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A glass composition for an electric lamp comprising, expressed in mol %:

| | |
|---|---|
| $SiO_2$ | 70 to 85%, |
| $Al_2O_3$ | 0 to 10%, |
| $B_2O_3$ | 0 to 10%, |
| $Li_2O$ | 0 to 6%, |
| $Na_2O$ | 1 to 7%, |
| $K_2O$ | 5 to 15%, |
| MgO | 0 to 5%, |
| CaO | 0 to 5%, |
| SrO | 0 to 0.5%, |
| BaO | 0.1 to 1% |
| ZnO | 0 to 2%, |
| PbO | 0 to 8.5%, | wherein a total amount of MgO, CaO, SrO, BaO, ZnO and PbO constitutes 2 to 8.5%;

wherein $K_2O$ is contained in a larger amount than an amount of $Na_2O$;

wherein a total amount of $Li_2O$, $Na_2O$ and $K_2O$ constitutes 12 to 17%;

wherein a brittleness index value B of the glass composition that is determined by the Vickers hardness test is 7,000 $m^{-1/2}$ or lower; and wherein a thermal expansion coefficient α of the glass composition is $91 \times 10^{-7}$ $K^{-1}$ to $97 \times 10^{7-}K^{-1}$, where the thermal expansion coefficient α is determined by a measurement performed at a temperature of 30 to 380° C.

2. The glass composition according to claim 1, wherein a content of PbO is not more than 5%.

3. The glass composition according to claim 1, wherein a total amount of CaO and MgO is larger than a total amount of BaO and SrO.

4. A bulb for an electric lamp comprising the glass composition according to claim 1.

5. A stem for an electric lamp comprising the glass composition according to claim 1.

6. An electric lamp comprising the glass composition according to claim 1.

* * * * *